(12) United States Patent
Komai et al.

(10) Patent No.: US 6,919,534 B2
(45) Date of Patent: Jul. 19, 2005

(54) WELDED JOINTS IN HIGH STRENGTH, HEAT RESISTANT STEELS, AND A WELDING METHOD THEREFOR

(75) Inventors: Nobuyoshi Komai, Nagasaki (JP); Fujimitsu Masuyama, Nagasaki (JP); Yasuhiro Ukeguchi, Nagasaki (JP); Fumio Nishi, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/140,261

(22) Filed: May 8, 2002

(65) Prior Publication Data

US 2003/0038167 A1 Feb. 27, 2003

(30) Foreign Application Priority Data

May 8, 2001  (JP) .......................................... 2001-137154

(51) Int. Cl.⁷ ................................................ B23K 9/23
(52) U.S. Cl. ................. 219/137 R; 228/255; 228/248.1
(58) Field of Search .......................... 219/76.12, 137 R; 228/134, 255, 256, 248.1

(56) References Cited

U.S. PATENT DOCUMENTS

| | | | | |
|---|---|---|---|---|
| 4,049,186 A | * | 9/1977 | Hanneman et al. ......... 228/225 |
| 4,187,410 A | * | 2/1980 | Eroshkin et al. .......... 219/137.2 |
| 4,196,335 A | * | 4/1980 | Ikeda et al. .................... 219/73 |
| 4,234,119 A | * | 11/1980 | Masaoka et al. ............ 228/125 |
| 4,348,131 A | * | 9/1982 | Shimanuki et al. .......... 403/272 |
| 4,436,562 A | * | 3/1984 | Tokuhisa et al. .............. 148/24 |
| 5,132,078 A | * | 7/1992 | Cai ............................. 376/462 |
| 5,156,321 A | * | 10/1992 | Liburdi et al. .............. 228/119 |
| 5,258,600 A | * | 11/1993 | Arthur ..................... 219/137 R |
| 5,532,454 A | * | 7/1996 | Kuhnen .................. 219/137 R |
| 6,193,145 B1 | * | 2/2001 | Fournier et al. ....... 228/262.41 |

* cited by examiner

Primary Examiner—Kiley S. Stoner
Assistant Examiner—Len Tran
(74) Attorney, Agent, or Firm—Wenderoth, Lind & Ponack, L.L.P.

(57) ABSTRACT

A welding method and a welded joint for high strength, temperature resistant steels produce the same strength as the base metal in the welded joint, thereby resolving strength problems in the heat affected area by making a simple change to the welding method. Additionally, this advantage is extended to high strength ferrite heat resistant steels by providing a multi-pass buildup welding method for such high strength ferrite heat resistant steels. A multi-layered cap 15a fusion area extends past the heat affected area 13 that lies outside groove 11, and the surface area of the foregoing extension that is required to impart the same level of creep strength as is inherent in the base metal is based on the relationship between the groove width and the base metal thickness shown as hatched area in FIG. 1(B).

8 Claims, 8 Drawing Sheets

S=1mm
D=5mm

WELDED JOINTS IN HIGH STRENGTH, HEAT RESISTANT STEELS, AND A WELDING METHOD THEREFOR

BACKGROUND OF THE INVENTION

1. Field of the Invention

The present invention relates to a welding method for welded joints in high strength, heat resistant steels, especially in high strength austenite stainless steels and high strength ferrite type heat resistant steels. In particular, it relates to a multi-pass buildup weld joint and welding method for high strength, heat resistant steels as well as a multi-pass buildup weld joint and welding method for high strength ferrite type heat resistant steels which improve the high temperature strength of the welded joints.

2. Description of the Related Art

Recently, improved electricity generation efficiency in thermal power plants has raised the temperatures and pressures for steam generation, which, in turn, has increased the use of high strength, heat resistant steels. Among such high strength, heat resistant steels, high strength austenite steels, and from the perspectives of economics and thermal expansion coefficients, the recently developed high strength ferrite type heat resistant steels based on tempered martensite compositions, have been used.

In particular, the high strength ferrite type heat resistant steels have low thermal expansion coefficients not seen in austenite steels, and have additional endurance, including high pressure resistance, resistance to stress and corrosion fractures, and resistance to peeling of their oxide scale. These advantages are not seen in austenite steels, and their low alloy content also makes them economical.

A great number of high chromium ferrite steels have been developed for use in heat resistant materials such as boilers and in heat conducting steel piping. These steels took advantage of the inherent strengths of conventional ferrite type heat resistant steels while offering further improvements in high temperature strength, corrosion resistance, and resistance to steam corrosion.

For example, Japan Patent Publication Hei 3-97832 and Japan Patent Publication Hei 5-311345 disclose technology of exceptional steels which retain adequate strength, corrosion resistance, and resistance to steam corrosion even in high temperature environments of 600 and above.

However, the steels disclosed above and the conventional high chromium ferrite steels were still plagued by a single unresolved problem, the "high temperature strength of welded joints."

Although Japan Patent Publication Hei 9-13150 disclosed a high chromium ferrite steel with excellent creep properties in its welded joints, for other generally used steels, the problem of high temperature strength in weld joints, caused by the welding heat inducing structural changes in the heat affected area of the weld joint, remained unresolved.

The aforementioned heat affected area is that area of the weld where heat influx during welding causes structural changes, and those structural changes are determined by the maximum heating temperature generated by the welding heat source and the rate of cooling.

To wit, the base metal area is affected by the welding heat from the welding line at the boundary between the base metal and the weld filler metal from successive temperature changes from high temperature just below its melting point to low temperatures. After rapid heating, the subsequent rapid cooling causes transformation, deposition, recovery, recrystallization, crystal growth, annealing, tempering or other metallurgical changes.

Further, since the welding heat source causes heating to high temperatures and then rapid cooling, the structure of the base metal in the weld heat affected area differs from the original structure of the base metal. In the case of high strength ferrite steels, this is one of the causes of a decline in high temperature strength properties in the weld joint, including the foregoing heat affected area.

FIG. 6(A) shows a welded joint and the groove for a weld made on the aforementioned high strength, heat resistant steel base metal using conventional welding techniques; FIG. 6(B) shows the creep rupture status.

As shown in FIG. 6(A), weld joint 55 was formed in groove 51 having root 52 using multiple pass layers.

Brittle fracture area 54 for the weld joint having the above described structure, as shown in FIG. 6(B), is within heat affected area 53.

The strength characteristics between base metal 10 and weld joint 55 for the foregoing conventional case are shown in FIG. 7. As is shown in the figure, the properties change according to time and temperature. In the prior art, reductions in creep fracture stress of 10 to 15% with respect to the stress of the base metal were seen.

FIG. 8 is a structural diagram showing a welding method, disclosed in Japan Patent Publication Hei 7-9147, for preventing brittleness in the heat affected area of highly pure ferrite stainless steels. In this proposal, a multi-pass buildup is performed by covered arc welding. The weld filler metal is built up to the final layer, and then the base metal surface in the heat affected area is fused using a pass from a TIG arc. The TIG arc, not requiring any flux to remove oxides in the aforementioned heat affected area, prevents brittleness in the heat affected area.

As described above, a structural change inevitably takes place in the aforementioned heat affected zone in the base metal when the weld filler metal is used to make a welded joint which causes, compared with the base metal, the high temperature strength of the welded joint overall, as described using the foregoing figures, to undergo about 10 to 15% stress reduction. Although a great deal of research has gone into the mechanism for this reduction and for improving the base metal component, the problem remains unresolved.

Accordingly, when high strength heat resistant steels, including the aforementioned high strength ferrite heat resistant steels, are used to fabricate high temperature equipment, the overall design for the piping and steel plate must be about 10% thicker to compensate for the decline in the high temperature strength of the welded joints.

Accordingly, enormous losses derive from the amount of material that needs to be used, and economy is lost. Also, incidents of fracture in the foregoing heat affected area of welded joints have been reported, and since rupture of such high temperature, high pressure equipment can cause life-threatening accidents, the problem is in urgent need of resolution.

SUMMARY OF THE INVENTION

The objective of the present invention is to resolve the above described problems by providing a welding method and a welding joint for high strength, temperature resistant steels that produces the same strength as the base metal in the welded joint, thereby resolving the strength problems in the heat affected area of conventional welded joint by making a simple change to the welding method, and additionally, to extend this advantage to high strength ferrite heat resistant steels by providing a multi-pass buildup welding method for such high strength ferrite heat resistant steels.

The present invention includes a welded joint for high strength, heat resistant steels wherein welded joints in high strength, heat resistant steels have the joint groove filled using the multi-pass buildup welding method, and subsequently, a multi-layered weld cap is created atop the weld face that fuses at least a part of the heat affected area. The structure is characterized by the fusion area on the foregoing heat affected area being formed by shifting the welding line from the toe of the groove and extending it over the entire range of the heat affected area on the surface of the base metal in order to form a multi-layered weld cap that covers the extended area. The surface area of the foregoing extension that is required to impart the same level of creep strength as is inherent in the base metal is based on the relationship between the groove width and the base metal thickness (see the hatched area of FIG. 1(B)).

To wit, after completing the multi-pass buildup welding of the groove, the above described invention requires, prior to forming the excess metal atop the weld, extending the welding line from the toe of the groove over the entire range of the heat affected area of the base metal to gradually extend the fusion area over the foregoing heat affected area and creating a multi-pass buildup on that surface to form the top weld cap on the base metal as a means of compensating for the decline in strength that would normally occur in the weld when subjected to high temperatures.

Accordingly, irrespective of the type of base metal used, it is possible to achieve high temperature joint strength that equals the inherent strength of the base metal.

In addition, in forming the upper multi-layered weld cap by the extension of the fusion area, the multi-pass buildup gradually absorbs the residual stress of the heat affected area on the surface of the base metal.

Thus, since residual stress in the heat affected area of the surface of the base metal in the area of the multi-layered cap has been successively absorbed through the foregoing extension of the fusion, it compensates for the decline in high temperature strength that would have resulted from the structural changes induced by the heat of welding.

Because, as described above, compensation is made for the decline in high temperature strength that would have resulted in the heat affected area by the heat of welding to make it possible for the welded joint to retain the same high temperature strength as the base metal, the present invention can also be proposed as a joint welding method for high temperature, heat resistant steels.

To wit, this invention includes a welding method for welding joints wherein, after completing the welding of the joint groove by multi-pass buildup welding, a multi-pass buildup welding method is used to deposit excess weld over at least a part of the heat affected area. This is characterized by forming a fusion zone in the foregoing heat affected area by beginning a welding line at the toe of the groove and, prior to forming excess metal atop the weld, successively extending the line over the entire range of the heat affected area on the surface of the base metal, using multi-pass buildup over the extended area. The same level of creep strength as is inherent in the base metal can be achieved using a computation map, which is based upon the relationship between the groove width and the thickness of the base metal, to determine the surface area for the foregoing fusion extension.

Further, the present invention includes a welded joint welding method for high strength, heat resistant steels that imparts the same level of high temperature strength to the joints as is inherent in the base metal, which, after completing the multi-pass buildup welding of the groove, fuses a multi-layered weld cap that covers at least a part of the heat affected area. The foregoing fusion area over the heat affected area is formed by successively extending the welding line from the toe of the groove over the entire area of the heat affected area on the surface of the base metal, with the fusion successively absorbing the residual stress that was created in the heat affected area on the surface of the base metal, to create a multi-pass buildup thereupon. The establishment of the extension surface area for the foregoing fusion extension, to achieve the same creep strength as is inherent in the base metal, may be determined by a computational map based upon the relationship between the groove width and the thickness of the base metal.

Also proposed in this invention is a welded joint welding method for high strength ferrite heat resistant steels that compensates for declines in the high temperature strength due to structural changes in the heat affected area of the joint from the heat of welding to thereby make possible the retention of the same high temperature strength that is inherent in the base metal. After completing the multi-pass buildup welding of the groove, a multi-layered weld cap that covers at least a part of the heat affected area is fused upon the surface of the base metal. The foregoing fusion area over the heat affected area is formed by successively extending the welding line from the toe of the groove over the entire area of the heat affected area on the surface of the base metal, with the foregoing fusion successively absorbsing the residual stress that was created in the heat affected area on the surface of the base metal, to create a multi-pass buildup thereupon. The establishment of the extension surface area to achieve the same creep strength as is inherent in the base metal for the foregoing fusion extension may be determined by a computational map based upon the relationship between the groove width and the thickness of the base metal.

Since the above described invention provides a welding method for joints in the high strength ferrite type heat resistant steels that are used in high temperature equipment, it is still possible to reduce losses from high temperature, high pressure equipment rupture without having to resort to designing-in about a 10% excess wall thickness for pipes and plates.

DETAILED DESCRIPTION OF THE PREFERRED EMBODIMENTS

In this section we shall explain several preferred embodiments of this invention with reference to the appended drawings. Whenever the size, materials, shapes, relative positions and other aspects of the parts described in the embodiments are not clearly defined, the scope of the invention is not limited only to the parts shown, which are meant merely for the purpose of illustration.

Figure 1A:
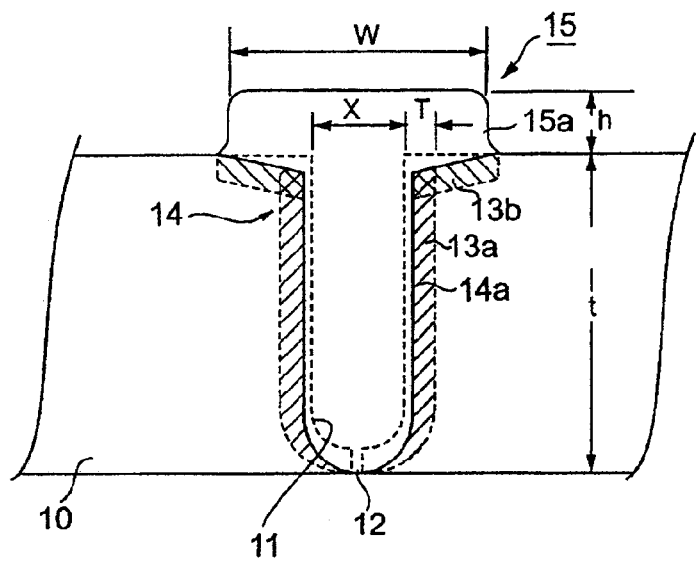
FIG. 1(A) is a diagram showing the groove shape, heat affected area, and the shape of the multi-pass buildup of weld filler when using the welding method of this invention.
Figure 1B:
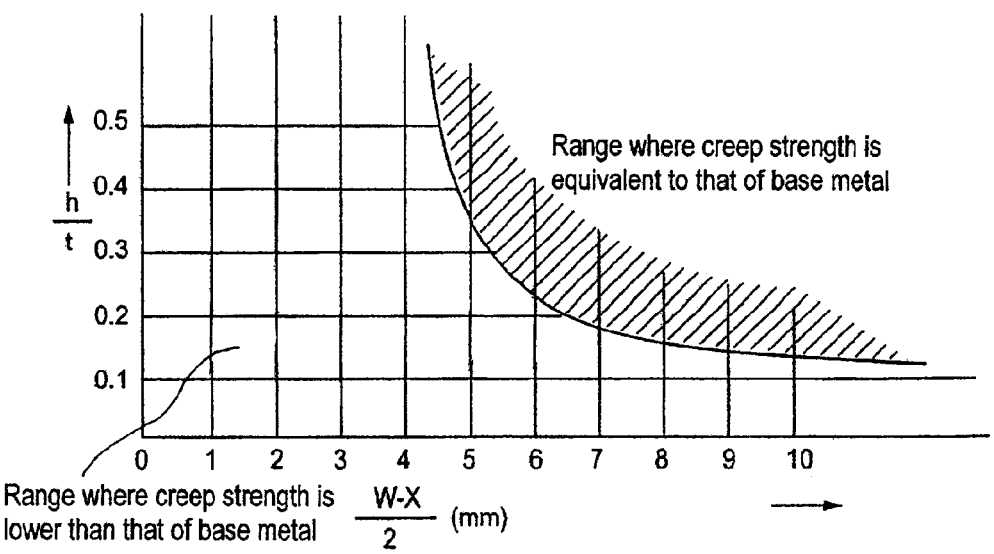
FIG. 1(B) is a graph of the relationships among the known values of t (base metal thickness) and X (the groove width), and the unknown values of h (the thickness of the layered area) and W (the width of the layered area).

FIG. 1(A) is a diagram showing the groove shape, heat affected area, and the shape of the multi-pass buildup of weld filler when using the welding method of this invention. FIG. 1(B) is a graph corresponding to a computational map of this invention of the relationships among the known values of t (base metal thickness) and X (the groove width), and the unknown values of h (the thickness of the layered area) and W (the width of the layered area) of FIG. 4(A).

As illustrated in FIG. 1(A), weld junction 15 of this invention formed in base metal 10 with a thickness of t, is comprised of "I"-shaped groove 11, having a width of X, and root 12; weld filler metal area 14 in the base metal, formed by multi-pass buildup welding in groove 11 with welding line 14a; and multi-layered cap 15a of weld filler metal having a thickness h. The width X is constant along a majority of the distance of the I-shaped groove 11 between a top surface and a bottom surface of the base metal, as readily seen in FIG. 1(A).

As shown by FIG. 1(A), the multi-layered cap 15a fusion area extends past the heat affected area 13a that lies outside groove 11 (shown by the right-rising hatching), and past the heat affected area 13b (shown by the right-descending hatching).

When forming welded joint 15 in base metal 10 with a thickness of t, first "I"-shaped groove 11 with root 12 and width X is formed. Next, the computational map shown in FIG. 1(B) is used with the foregoing known values for t and X, to determine both the height h for the multi-layered cap [(W−X)/2] and, with the width T of heat affected area 13a used to determine, from the graph, an optimal design value for W, the width of the foregoing multi-layered top cap 15a.

The sectional view shown in FIG. 1(A) is applicable to either the base metal being in the form of flat steel, or thick-walled steel pipe.

The area of hatching in FIG. 1(B) represents the range where the creep strength is equivalent to that of the base metal, while the area beneath the curve is the range where the creep strength would be lower than that of the base metal.

Thus, the size of the extension of the foregoing layered cap 15a over the heat affected area, when derived as value W, which is the width of heat affected area 13b, with thickness T from the graph (computational map), any high temperature creep fracture would not occur in the welded joint, but rather in the base metal.

Figure 2:
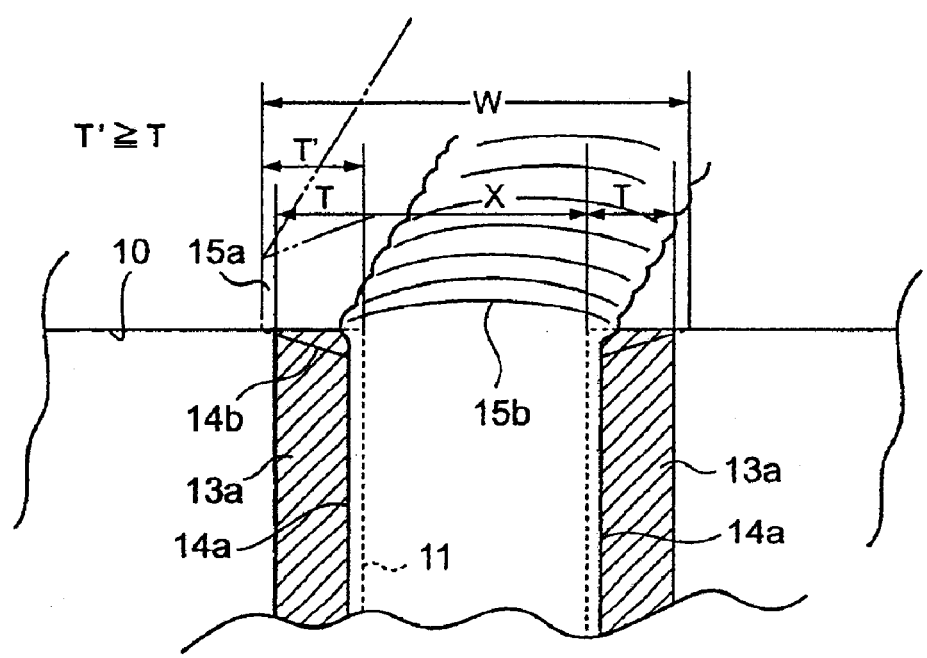
FIG. 2 is a sketch showing the process of the multi-layer cap formation with excess weld that is performed after the multi-pass buildup filling of the groove for welded joint 15 of FIG. 1.

FIG. 2 shows the process of multi-layer cap formation with excess weld that is performed after the multi-pass buildup filling of the groove for welded joint 15 of FIG. 1.

As the figure illustrates, the multi-pass buildup weld is performed to the fusion line 14b up to the toe of groove 11. After forming excess weld 15b to at least fuse over a part of heat affected area 13a, the fusion area of the foregoing heat affected area 13a is extended to at least the width T', which is slightly wider than T, over heat affected area 13a on the surface of the base metal working the line from 14a toward 14b. The toe of the I-shaped joint groove 11 is formed into a tapered portion broadening upward with a slow grade. Then the multi-layer cap 15a is formed over the extended area on the surface of the base metal to a width of W.

Because the multi-layer cap formed by extending the aforementioned fusion area by moving the welding line from 14a to 14b causes the residual stresses in the foregoing heat affected area 13a on the surface of the base metal to be gradually absorbed through the extension of the foregoing fusion area, the method is effective in compensating for the loss of high temperature strength that would otherwise occur from the input of welding heat to the heat affected zone.

Figure 3A:
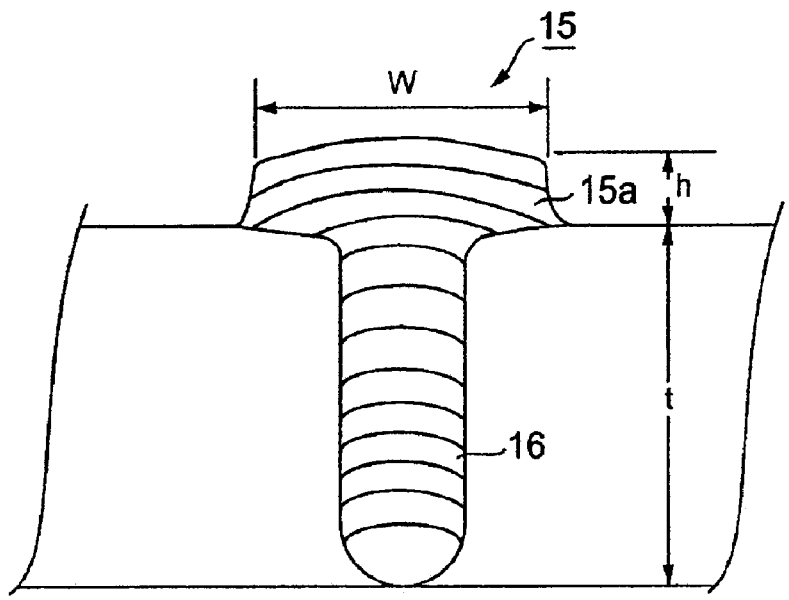
FIG. 3(A) is a sketch showing an embodiment resulting from the use of the welding method of this invention. It shows multi-pass buildup in the welded joint formed in the base metal having a thickness t, as well as the shape of multi-layer cap 15a, having a height h and width W.

FIG. 3(A) shows an embodiment resulting from the use of the welding method of this invention shown in FIG. 1. It shows multi-pass buildup 16 in the welded joint formed in the base metal having a thickness t, as well as the shape of multi-layer cap 15a, having a height h and width W.

Figure 3B:
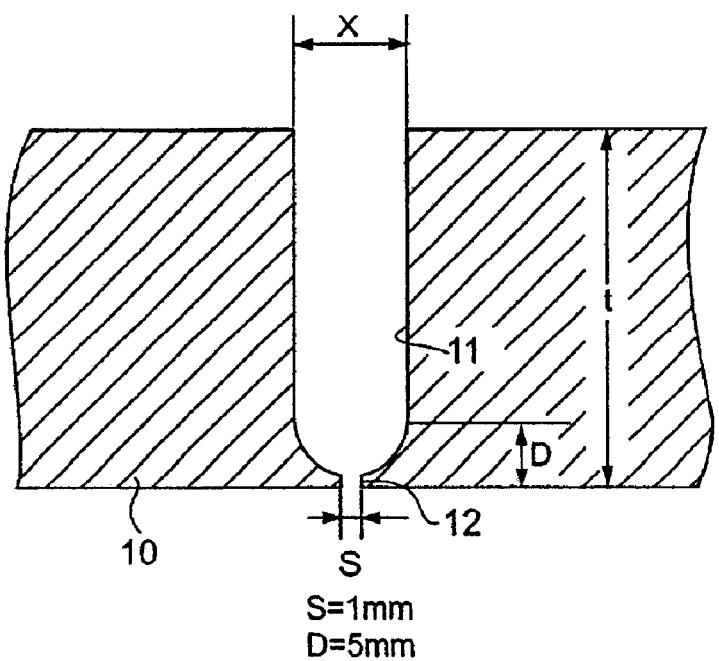
FIG. 3(B) is a sketch showing the details of groove 11 that was formed in base metal for the embodiment shown in FIG. 3(A).

FIG. 3(B) shows the details of the groove 11 that was formed in base metal 10 for the embodiment shown in FIG. 3(A).

As described above, the foregoing groove 11 was formed in base metal 10 having a thickness t, along with root 12 having a width S, to create an "I"-shaped groove with a floor rounded to radius D.

As detailed in Table 1, the material in the foregoing example was large diameter, thick-walled pipe made of high strength ferrite type heat resistant steel. The welding is made in an inert atmosphere by generating an arc between the electrodes and the base metal. In this step, TIP welding is used in which a welding wire of a welding agent is inserted into the arc to remove the oxide membrane, and a multi-layer welding is made for 40 welding layers.

TABLE 1

| Base Metal | Commercial ASME SA-335 P91 large diameter thick walled pipe (diameter 350 × thickness 50) |
|---|---|
| Welding Materials | Commercial improved 9CR copper TIG welding wire (diameter 1.2 mm) Welding conditions: preheating temperature 150 degrees C. Welding current: 90–300 A Welding voltage: 9–14 V Welding rate: 60 mm/minute Number of layers: 40 layers |
| Heat treatment | SR stress relief annealing after welding for 2 hr. at 750 degrees C. |

Figure 4A:
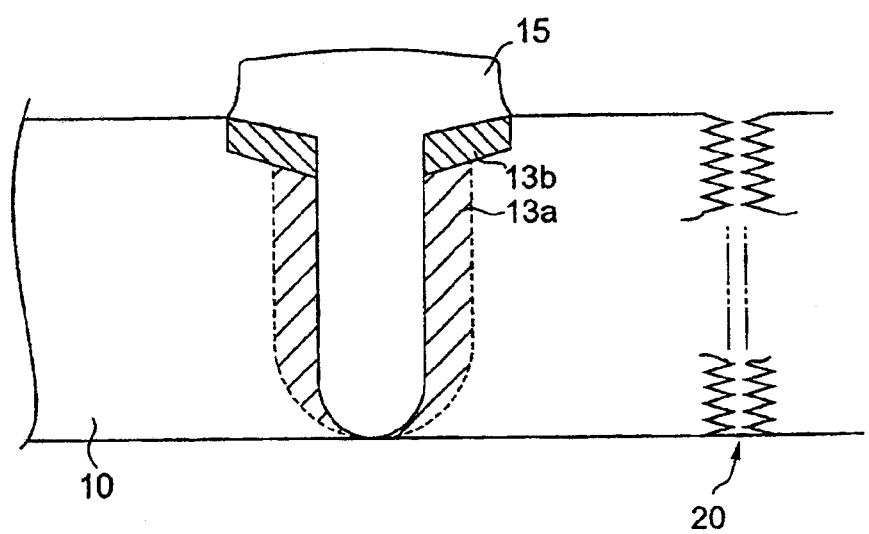
FIG. 4(A) is a sketch showing the results of destructive testing on the embodiment shown in the foregoing FIG. 3.
Figure 6A:
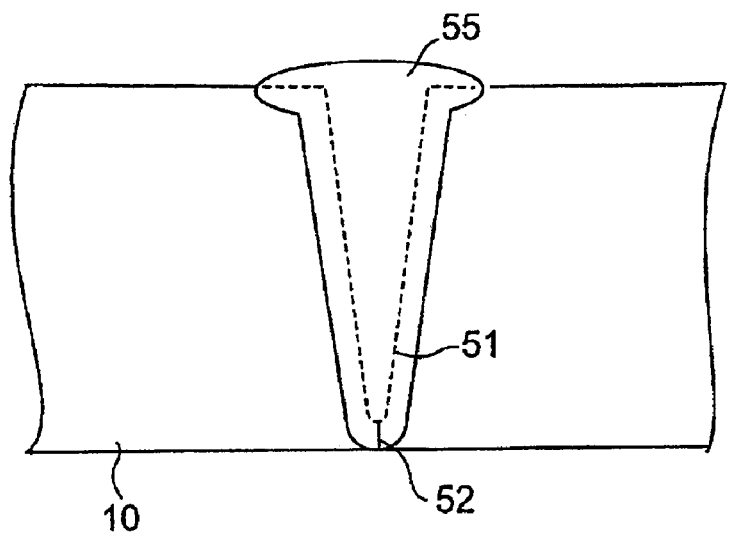
FIG. 6(A) is a rough sketch showing a welded joint according to a prior art.
Figure 6B:
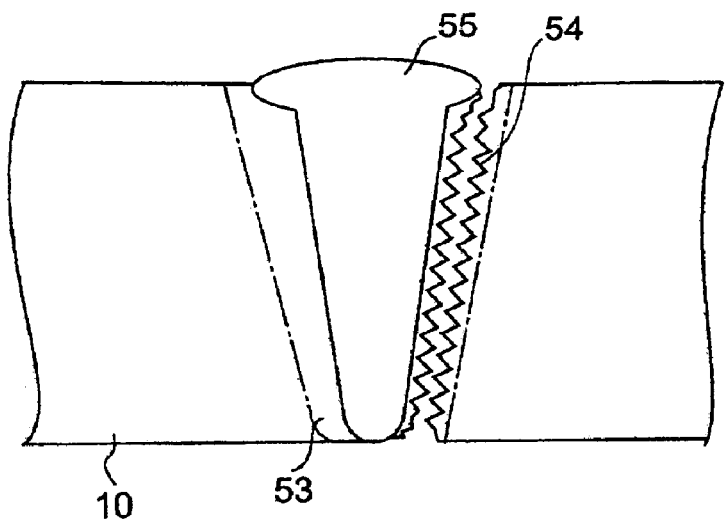
FIG. 6(B) is a sketch showing the creep rupture status.
Figure 7:
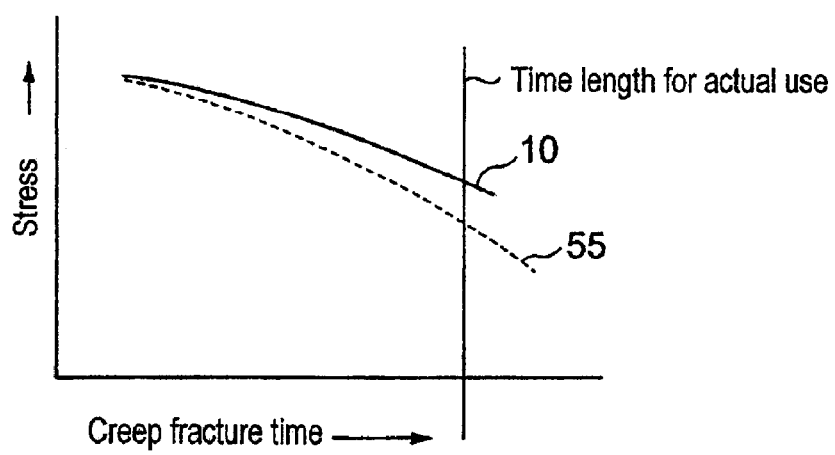
FIG. 7 is a graph showing the characteristic of resistance to stress according to the prior art.
Figure 8:
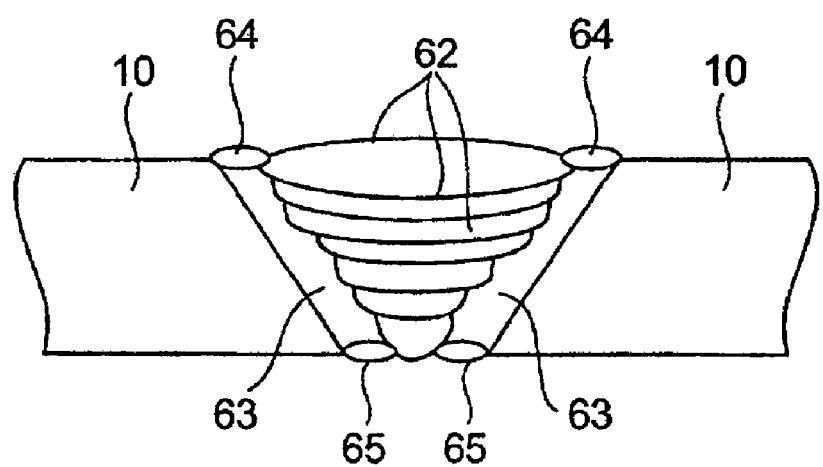
FIG. 8 is a structural diagram showing the welding method according to the prior art for preventing brittleness in the heat affected area of a welded joint.

FIG. 4(A) shows the results of fracture testing on the embodiment shown in the foregoing FIG. 3. Compared with the previously cited conventional welded joint shown in FIG. 6(B), in which the fracture position was in creep fracture area 54 of the welded joint and near the heat affected area, the joint welded according to the welding method of the present invention exhibited fracture 20 in base metal 10, thereby demonstrating that the joint had a strength equal to or greater than that of the base metal.

Figure 4B:
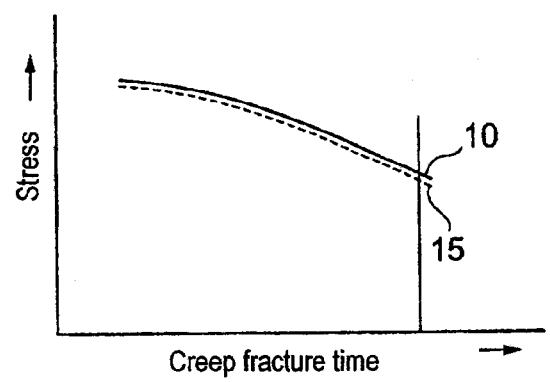
FIG. 4(B) is a graph showing the characteristics of resistance to stress.

Further, as is apparent from the high temperature creep fracture properties graph in FIG. 4(B), the strength of the welded joint 15 according to this invention was almost identical to that of base metal 10. None of the 10–15% decreased stress as shown in the previously cited FIG. 6 for a conventionally welded joint was noted. These results indicated that welded joints according to the present invention retain about the same level of high temperature strength as the base metal.

This means that, compared with high temperature equipment welded by conventional welding techniques, the present method allows a reduction in pipe wall thickness of 10 to 15%, and about the same level of reduction in the amount of material used for fabrication.

Figure 5:
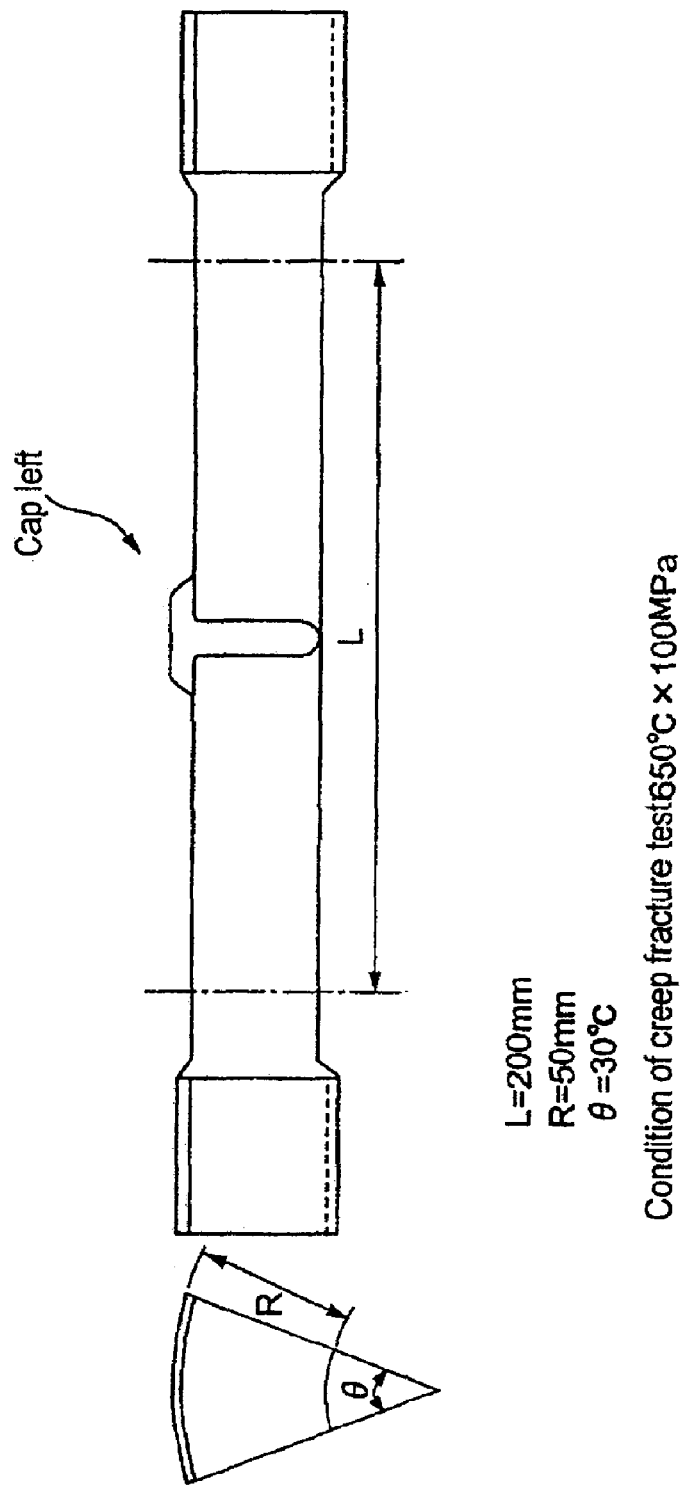
FIG. 5 is a sketch showing the rough structure of the creep fracture test samples used in the creep fracture tests, which were used to evaluate the high temperature brittle fracture status for joints welded according to the method of this invention.

FIG. 5 shows the dimensions of the creep fracture test samples used in the creep fracture tests, which were used to evaluate the high temperature brittle fracture status for joints welded according to the method of this invention.

Table 2 shows the results of the creep fracture tests for welded joints when constant dimensions were used for the 50 mm thick base metal and X=15 mm for the width of the groove, while varying the dimension h and W for the multi-layered buildup.

TABLE 2

| Base metal member | t | h | w | x | h/t | (w − x)/2 | Time (hours) in creep fracture at 650 degrees C. × 100 MPA | Result of creep fracture |
|---|---|---|---|---|---|---|---|---|
|  | 60 | — | — | — | — | — | 1013 | — |
| 1 | 50 | 0 | 15 | 16 | 0.00 | 0 | 274 | x |
| 2 | 50 | 2 | 15 | 15 | 0.04 | 0 | 218 | x |
| 3 | 50 | 4 | 15 | 15 | 0.08 | 0 | 214 | x |
| 4 | 50 | 6 | 15 | 15 | 0.12 | 0 | 242 | x |
| 5 | 60 | 8 | 15 | 16 | 0.16 | 0 | 288 | x |
| 6 | 60 | 10 | 15 | 15 | 0.20 | 0 | 304 | x |
| 7 | 60 | 12 | 15 | 16 | 0.24 | 0 | 134 | x |
| 8 | 50 | 14 | 15 | 16 | 0.28 | 0 | 135 | x |
| 9 | 50 | 0 | 17 | 16 | 0.00 | 1 | 213 | x |
| 10 | 60 | 2 | 17 | 15 | 0.04 | 1 | 216 | x |
| 11 | 60 | 4 | 17 | 16 | 0.08 | 1 | 176 | x |
| 12 | 60 | 6 | 17 | 15 | 0.12 | 1 | 301 | x |
| 13 | 60 | 8 | 17 | 15 | 0.16 | 1 | 236 | x |
| 14 | 60 | 10 | 17 | 15 | 0.20 | 1 | 107 | x |
| 15 | 60 | 12 | 17 | 15 | 0.24 | 1 | 161 | x |
| 16 | 50 | 14 | 17 | 15 | 0.28 | 1 | 111 | x |
| 17 | 50 | 0 | 19 | 15 | 0.00 | 2 | 210 | x |
| 18 | 50 | 2 | 19 | 15 | 0.04 | 2 | 160 | x |
| 19 | 50 | 4 | 19 | 16 | 0.08 | 2 | 134 | x |
| 20 | 50 | 6 | 19 | 15 | 0.12 | 2 | 121 | x |
| 21 | 50 | 8 | 19 | 15 | 0.15 | 2 | 147 | x |
| 22 | 50 | 10 | 19 | 18 | 0.20 | 2 | 213 | x |
| 23 | 50 | 12 | 19 | 16 | 0.24 | 2 | 113 | x |
| 24 | 60 | 14 | 19 | 16 | 0.28 | 2 | 274 | x |
| 25 | 50 | 0 | 21 | 16 | 0.00 | 3 | 217 | x |
| 26 | 50 | 2 | 21 | 16 | 0.04 | 3 | 121 | x |
| 27 | 50 | 4 | 21 | 18 | 0.08 | 3 | 160 | x |
| 28 | 50 | 6 | 21 | 15 | 0.12 | 3 | 249 | x |
| 29 | 50 | 8 | 21 | 16 | 0.16 | 3 | 121 | x |
| 30 | 50 | 10 | 21 | 15 | 0.20 | 3 | 243 | x |
| 31 | 50 | 12 | 21 | 16 | 0.24 | 3 | 125 | x |
| 32 | 60 | 14 | 21 | 15 | 0.28 | 3 | 213 | x |
| 33 | 60 | 0 | 23 | 16 | 0.00 | 4 | 177 | x |
| 34 | 50 | 2 | 23 | 16 | 0.04 | 4 | 225 | x |
| 35 | 60 | 4 | 23 | 16 | 0.08 | 4 | 165 | x |
| 36 | 60 | 6 | 23 | 15 | 0.12 | 4 | 128 | x |
| 37 | 60 | 8 | 23 | 15 | 0.16 | 4 | 247 | x |
| 38 | 60 | 10 | 23 | 16 | 0.20 | 4 | 880 | x |
| 39 | 60 | 12 | 23 | 16 | 0.24 | 4 | 1079 | o |
| 40 | 60 | 14 | 23 | 16 | 0.28 | 4 | 1111 | o |
| 41 | 60 | 0 | 25 | 15 | 0 | 5 | 220 | x |
| 42 | 50 | 2 | 25 | 16 | 0.04 | 5 | 219 | x |
| 43 | 50 | 4 | 25 | 16 | 0.08 | 5 | 550 | x |
| 44 | 50 | 6 | 25 | 15 | 0.12 | 5 | 733 | x |
| 45 | 50 | 8 | 25 | 15 | 0.16 | 5 | 1034 | o |
| 46 | 50 | 10 | 25 | 16 | 0.2 | 5 | 1142 | o |
| 47 | 50 | 12 | 25 | 16 | 0.24 | 5 | 1046 | o |
| 48 | 60 | 14 | 25 | 15 | 0.38 | 5 | 1126 | o |
| 49 | 50 | 0 | 27 | 15 | 0 | 6 | 233 | x |
| 50 | 50 | 2 | 27 | 15 | 0.04 | 6 | 408 | x |
| 51 | 50 | 4 | 27 | 15 | 0.08 | 6 | 980 | x |
| 52 | 60 | 6 | 27 | 18 | 0.12 | 6 | 1118 | o |
| 53 | 50 | 8 | 27 | 18 | 0.15 | 6 | 1033 | o |
| 54 | 60 | 10 | 27 | 15 | 0.2 | 6 | 1034 | o |
| 55 | 60 | 12 | 27 | 15 | 0.24 | 6 | 1018 | o |
| 56 | 50 | 14 | 27 | 16 | 0.28 | 6 | 1028 | o |
| 57 | 60 | 0 | 29 | 10 | 0 | 7 | 137 | x |
| 58 | 50 | 2 | 29 | 16 | 0.04 | 7 | 320 | x |
| 59 | 50 | 4 | 29 | 16 | 0.08 | 7 | 673 | x |
| 60 | 50 | 6 | 29 | 18 | 0.12 | 7 | 1034 | o |
| 61 | 50 | 8 | 29 | 18 | 0.15 | 7 | 1055 | o |
| 62 | 50 | 10 | 29 | 15 | 0.2 | 7 | 1034 | o |
| 63 | 50 | 12 | 29 | 15 | 0.24 | 7 | 1100 | o |
| 64 | 50 | 14 | 29 | 16 | 0.25 | 7 | 1034 | o |
| 65 | 60 | 0 | 31 | 16 | 0 | 8 | 237 | x |
| 66 | 50 | 2 | 31 | 16 | 0.04 | 8 | 354 | x |
| 67 | 50 | 4 | 31 | 16 | 0.08 | 8 | 638 | x |
| 68 | 60 | 6 | 31 | 15 | 0.12 | 8 | 1024 | o |
| 69 | 50 | 8 | 31 | 16 | 0.16 | 8 | 1075 | o |
| 70 | 50 | 10 | 31 | 16 | 0.2 | 8 | 1034 | o |
| 71 | 60 | 12 | 31 | 18 | 0.24 | 8 | 1005 | o |
| 72 | 50 | 14 | 31 | 18 | 0.28 | 8 | 1117 | o |

(Note): In table 2, the circle marks in the creep strength mean that the strength is the same level as that of the base metal, and X marks mean weaker than the base metal.

As is apparent from Table 2, for the creep strength to reach about the same level as that of the base metal, it approximately satisfies the relationship between h/t and (W−X)/2, as is shown in the graph of FIG. 1(B).

Thus, it is possible to use existing welding equipment and simply vary the welding technique to produce welded joints having a strength on a par with that of the base metal. Compared with high temperature equipment fabricated by conventional welding techniques, this invention makes it possible to reduce pipe wall thickness by 10–15%, and make similar reductions in the amount of material used.

This in turn reduces fabrication costs for high temperature equipment, conserves resources, and contributes to reducing the costs per unit of electricity generated. It also facilitates the reliability of the high temperature equipment.

The present invention is further markedly effective with high strength ferrite type heat resistant steels, which are normally subject to dramatic strength reductions in the welding heat affected area. It allows their unique advantages, which are not seen in austenite type steels, to be effectively exploited.

What is claimed is:

1. A welded joint, comprising:
    an I-shaped joint groove in a base metal of high strength, heat resistant steel filled with multi-pass buildup welding, said I-shaped joint groove having a toe, a width X and a root, a weld face and a heat affected area formed by said welding; and a multi-layered weld cap atop the weld face that fuses at least a part of said heat affected area;

wherein said high strength, heat-resistant steel is ferrite type heat resistant steel;

wherein a toe of said I-shaped joint groove is formed into a tapered portion broadening upward with a slow grade; and wherein a fusion area on the heat affected area is formed by shifting a welding line from a toe of said joint groove and extending the welding line over an extended area having a width T' that is slightly wider than a width T of the heat affected area on the surface of the base metal in order to form said multi-layered weld cap to cover said extended area, and said multi-layer weld cap extending over a width X+2T' which is wider than the groove width X; and wherein the width X is constant along a majority of the distance of said I-shaped joint groove between a top surface and a bottom surface of said base metal.

2. The welded joint of claim 1, wherein said heat affected area has a level of creep strength that is at least the same as that inherent in the base metal and a surface area of said extended area required to impart the level of creep strength to said heat affected area is determined using a computation map based on a relationship between the width of said joint groove and the thickness of the base metal.

3. The welded joint of claim 1, wherein said multi-layered weld cap over said extended area is formed by multi-pass buildup which gradually absorbs residual stress of said heat affected area on the surface of the base metal.

4. A welding method for a welded joint in a base metal of high strength, heat resistant steel having an I-shaped joint groove with width X and a root filled by multi-pass buildup welding and subsequently covered with a multi-layered weld cap atop a weld face that fuses at least a part of a heat affected area, comprising:

forming a fusion area in the heat affected area by beginning a welding line at a toe of the groove and successively extending the line to a width T' over an extended area that is slightly wider than a width T of the heat affected area on the surface of the base metal and forming multi-pass buildup over the extended area; and subsequently forming excess metal atop the multi-pass buildup over the extended area;

wherein the high strength, heat resistant steel is ferrite type heat resistant steel;

wherein said heat affected area has a level of creep strength that is at least the same as that inherent in the base metal and a surface area of said extended area required to impart the level of creep strength to said heat affected area is determined using a computation map based on a relationship between the width of said joint groove and the thickness of the base metal; and wherein said toe of the groove is tapered and flattened, and said multi-layer weld cap extends over a width X+2T' which is wider than groove width X; and wherein the width X is constant along a majority of the distance of the I-shaped joint groove between a top surface and a bottom surface of said base metal.

5. A welded joint, comprising:

an I-shaped joint groove with width X and a root in a base metal of high strength, heat resistant steel filled with multi-pass buildup welding, said multi-pass welding having a heat affected area adjacent thereto in said base metal, and said heat affected area having a width T with respect to the surface of said base metal;

an extended fusion area at a toe of said joint groove that extends to a width T' that is slightly wider than said width T; and a multi-layered weld cap atop said extended fusion area, said multi-layered weld cap being wider than said width T;

wherein said high strength, heat-resistant steel is high strength ferrite type heat resistant steel; and wherein said toe of the groove is tapered and flattened, and said multi-layer weld cap extends over a width X+2T' which is wider than groove width X; and wherein the width X is constant along a majority of the distance of said I-shaped joint groove between a top surface and a bottom surface of said base metal.

6. The welded joint of claim 5, wherein said heat affected area has a level of creep strength that is at least the same as that inherent in the base metal and a surface area of said extended fusion area required to impart the level of creep strength to said heat affected area is determined using a computation map based on a relationship between the width of said joint groove and the thickness of the base metal.

7. The welded joint of claim 5, wherein said multi-layered weld cap over said extended fusion area is formed by multi-pass buildup which gradually absorbs residual stress of said heat affected area on the surface of the base metal.

8. A welding method comprising:

filling an I-shaped joint groove of a base metal of high strength ferrite type heat resistant steel by multi-pass buildup welding, said joint groove having a width X and a root;

subsequently forming excess weld to at least fuse over a part of a heat affected area of the base metal adjacent the joint groove;

extending a fusion area in the heat affected area by beginning a welding line at a toe of the groove and successively extending the line to a width T' over an extended fusion area that is slightly wider than a width T of the heat affected area on the surface of the base metal and forming multi-pass buildup over the extended fusion area; and subsequently forming excess metal atop the multi-pass buildup over the extended area;

wherein said heat affected area has a level of creep strength that is at least the same as that inherent in the base metal and a surface area of said extended fusion area required to impart the level of creep strength to said heat affected area is determined using a computation map based on a relationship between the width of said joint groove and the thickness of the base metal; and wherein said toe of the groove is tapered and flattened, and said multi-layer weld cap extends over a width X+2T' which is wider than groove width X; and wherein the width X is constant along a majority of the distance of the I-shaped joint groove between a top surface and a bottom surface of the base metal.

* * * * *